(12) United States Patent
Keyser et al.

(10) Patent No.: US 9,943,637 B2
(45) Date of Patent: *Apr. 17, 2018

(54) MICROPOROUS ZIRCONIUM SILICATE AND ITS METHOD OF PRODUCTION

(71) Applicant: ZS Pharma, Inc., Fort Worth, TX (US)

(72) Inventors: Donald Jeffrey Keyser, Southlake, TX (US); Alvaro F. Guillem, Lantana, TX (US)

(73) Assignee: ZS PHARMA, INC., Fort Worth, TX (US)

(*) Notice: Subject to any disclaimer, the term of this patent is extended or adjusted under 35 U.S.C. 154(b) by 379 days.

This patent is subject to a terminal disclaimer.

(21) Appl. No.: 13/829,415

(22) Filed: Mar. 14, 2013

(65) Prior Publication Data

US 2013/0334122 A1    Dec. 19, 2013

Related U.S. Application Data

(60) Provisional application No. 61/658,117, filed on Jun. 11, 2012.

(51) Int. Cl.

| | |
|---|---|
| *A61M 1/36* | (2006.01) |
| *B01J 39/02* | (2006.01) |
| *B01J 39/14* | (2006.01) |
| *C01B 39/00* | (2006.01) |

(52) U.S. Cl.
CPC .......... *A61M 1/3679* (2013.01); *B01J 39/02* (2013.01); *B01J 39/14* (2013.01); *C01B 39/00* (2013.01); *Y10T 428/2982* (2015.01)

(58) Field of Classification Search
CPC .......... B01J 39/02; B01J 39/14; C01B 39/00
See application file for complete search history.

(56) References Cited

U.S. PATENT DOCUMENTS

| | | |
|---|---|---|
| 3,329,480 A | 7/1967 | Young |
| 3,947,279 A | 3/1976 | Hudecek |
| 4,581,141 A | 4/1986 | Ash |
| 4,943,545 A | 7/1990 | Chang |
| 5,338,527 A | 8/1994 | Lambert |

(Continued)

FOREIGN PATENT DOCUMENTS

| | | |
|---|---|---|
| EP | 0384728 | 8/1990 |
| EP | 0451958 | 10/1991 |

(Continued)

OTHER PUBLICATIONS

International Search Report issued in PCT/US13/45219, mailed Nov. 8, 2013.

(Continued)

*Primary Examiner* — Kortney L. Klinkel
(74) *Attorney, Agent, or Firm* — Arent Fox LLP

(57) ABSTRACT

The present invention relates to novel microporous zirconium silicate compositions having a desired particle size distribution and methods of making those compositions. These compositions have an ideal particle size distribution for use ex vivo, for example in a dialysis exchange cartridge, yet retain many of the desirable properties of prior improved absorbers including high cation exchange capacity. Further, the new zirconium silicate molecular sieve absorbers can be manufactured using a technique that achieves the desired particle size distribution while eliminating the screening step that was previously necessary.

13 Claims, 12 Drawing Sheets

Red = ZrO3 (oct), Yellow = SiO2 (tet), Cations not shown

(56) References Cited

U.S. PATENT DOCUMENTS

| | | | |
|---|---|---|---|
| 5,518,707 | A | 5/1996 | Bedard et al. |
| 5,624,652 | A | 4/1997 | Aldcroft et al. |
| 5,888,472 | A | 3/1999 | Bem et al. |
| 5,891,417 | A | 4/1999 | Bem et al. |
| 5,910,299 | A | 6/1999 | Carluccio et al. |
| 6,007,790 | A | 12/1999 | Bedard et al. |
| 6,099,737 | A | 8/2000 | Sherman et al. |
| 6,146,613 | A | 11/2000 | Anglerot et al. |
| 6,159,505 | A | 12/2000 | Piper |
| 6,332,985 | B1 | 12/2001 | Sherman et al. |
| 6,379,641 | B1 | 4/2002 | Bedard et al. |
| 6,579,460 | B1 | 6/2003 | Willis et al. |
| 6,596,254 | B1 | 7/2003 | Nenoff et al. |
| 6,689,335 | B1 | 2/2004 | Bringley et al. |
| 6,814,871 | B1 | 11/2004 | Bem et al. |
| 7,297,319 | B2 | 11/2007 | Vitale-Rojas et al. |
| 7,488,495 | B2 | 2/2009 | Charmot et al. |
| 7,566,432 | B2 | 7/2009 | Wong |
| 7,854,924 | B2 | 12/2010 | Alpern et al. |
| 7,967,984 | B2 | 6/2011 | Midorikawa et al. |
| 8,093,350 | B2 | 1/2012 | Jung et al. |
| 8,192,758 | B2 | 6/2012 | Charmot et al. |
| 8,282,960 | B2 | 10/2012 | Charmot et al. |
| 8,431,502 | B2 | 4/2013 | Dejneka et al. |
| 8,802,152 | B2 | 8/2014 | Keyser et al. |
| 8,808,750 | B2 | 8/2014 | Keyser et al. |
| 8,877,255 | B2 | 11/2014 | Keyser et al. |
| 9,301,974 | B2 | 4/2016 | Cope et al. |
| 2003/0228377 | A1 | 12/2003 | Fanelli |
| 2004/0005575 | A1 | 1/2004 | Rosen et al. |
| 2004/0105895 | A1 | 6/2004 | Ash |
| 2005/0106267 | A1 | 5/2005 | Frykman et al. |
| 2005/0220752 | A1 | 10/2005 | Charmot et al. |
| 2007/0128424 | A1 | 6/2007 | Omori et al. |
| 2007/0202180 | A1 | 8/2007 | Liversidge et al. |
| 2007/0269499 | A1 | 11/2007 | Hen et al. |
| 2008/0241092 | A1 | 10/2008 | Charmot et al. |
| 2009/0155370 | A1 | 6/2009 | Cope et al. |
| 2009/0186093 | A1 | 7/2009 | Liu et al. |
| 2009/0263478 | A1 | 10/2009 | Arnold et al. |
| 2010/0104527 | A1 | 4/2010 | Mansky et al. |
| 2010/0322847 | A1 | 12/2010 | Xiao et al. |
| 2011/0097401 | A1 | 4/2011 | Phillips et al. |
| 2012/0070468 | A1 | 3/2012 | Bedard et al. |
| 2012/0213847 | A1 | 8/2012 | Keyser et al. |
| 2012/0259141 | A1 | 10/2012 | Yilmaz et al. |
| 2012/0289931 | A1 | 11/2012 | Robinson et al. |
| 2013/0123096 | A1 | 5/2013 | Xiao et al. |
| 2013/0129611 | A1 | 5/2013 | Maurer et al. |
| 2013/0202524 | A1 | 8/2013 | Maurer et al. |
| 2013/0259949 | A1 | 10/2013 | Cope et al. |
| 2013/0296159 | A1 | 11/2013 | Feyen et al. |
| 2014/0044804 | A1 | 2/2014 | Cope et al. |

FOREIGN PATENT DOCUMENTS

| | | |
|---|---|---|
| EP | 0832897 A2 | 4/1998 |
| EP | 1038580 | 3/1999 |
| EP | 0982785 | 3/2000 |
| ES | 2304890 | 10/2008 |
| GB | 2 038 301 A | 7/1980 |
| GB | 2038301 | 7/1980 |
| JP | H08-268706 A | 10/1996 |
| JP | 2000-279949 A | 10/2000 |
| WO | WO 94/10087 A1 | 5/1994 |
| WO | 02062356 | 8/2002 |
| WO | 2005053650 A1 | 6/2005 |
| WO | 2007100466 | 11/2007 |
| WO | 2010022381 | 2/2010 |
| WO | 2012109590 A2 | 8/2012 |

OTHER PUBLICATIONS

Written Opinion of the International Searching Authority issued in PCT/US13/45219, mailed Nov. 8, 2013.
International Preliminary Report on Patentability and Written Opinion of PCT/US2013/050071 mailed Dec. 9, 2013.
International Search Report and Written Opinion of PCT/US2014/064542 mailed Jan. 27, 2015.
International Search Report and Written Opinion of PCT/US2014/064548 mailed Jan. 27, 2015.
International Search Report and Written Opinion of PCT/US2014/69524 mailed Mar. 3, 2015.
Timmer et al., Journal of the American Society of Nephrology (1999) vol. 10, pp. 666-674.
Stephen R. Ash, "Sorbents in Treatment of Uremia: A Short History and a Great Future," Seminars in Dialysis, vol. 22, No. 6 (Nov.-Dec. 2009), pp. 615-622.
Stephen R. Ash, Cation Exchangers as Oral Sorbents for Ammonium and Potassium: PSS, ZP and ZS (Zirconium Silicate), Clarian Arnett Health, Wellbound and HemoCleanse Inc., Lafayette, IN, (2007), ASAIO Innovation Conference, Chicago (25 pages).
Baussy et al., Bull. Soc. fr. Mineral. Cristallogr. (1974) vol. 97, pp. 433-444.
David S. Bem et al., "Synthesis and Characterization of a New Family of Microporous Zirconium Silicates," (1999), Materials Research Society, Symposium Procedures, vol. 549, pp. 73-78.
Bortun et al., Chem. Mater. (1997) vol. 9, No. 8, pp. 1854-1864.
Rich Braun et al., "Ammonium Removal With a Novel Zirconium Silicate," Presentation, (2001), ASAIO Conference (16 pages).
Chukanov et al., Russian Journal of Physical Chemistry B (2011) vol. 5, No. 2, pp. 278-283.
Chukanov et al., Russian Journal of Physical Chemistry B (2011) vol. 5, No. 2, pp. 284-289.
Chukanov et al., Minerals as Advanced Materials Ii (2012) pp. 167-179 (S.V. Krivovichev (ed)).
Clearfield et al., Journal of Molecular Structure (1998) vol. 470, pp. 207-213.
Dunn et al., American Mineralogist (1977) vol. 62, pp. 416-420.
Ferreira et al., Chem. Mater. (2001) vol. 13, pp. 355-363.
Ferreira et al., Inorganica Chimica Acta (2003) vol. 356, pp. 19-26.
Ferreira et al., Journal of Solid State Chemistry (2010) vol. 183, pp. 3067-3072.
Fewox et al., J. Phys. Chem. A (2008) vol. 112, pp. 2589-2597.
Fundamental of Physics © 1997 John Wiley & Sons, Inc., USA, pp. 947-949, section 37-9 X-Ray Diffraction.
Henderson, Lee W., Seminars in Dialysis (2012) vol. 25, No. 3, pp. 320-325.
International Search Report and Written Opinion of PCT/US2012/024727 mailed Aug. 7, 2012.
International Search Report and Written Opinion of PCT/US2013/066207 mailed Feb. 14, 2014.
International Search Report and Written Opinion of PCT/US2014/032815 mailed Nov. 6, 2014.
Lopes et al., Quim. Nova. (2008) vol. 31, No. 2, pp. 321-325.
Navascues et al., Desalination (2006) vol. 199, pp. 368-370.
Navascues et al., Chemical Engineering and Processing (2008) vol. 47, pp. 1139-1149.
Pekov et al., Cryst. Report (2010) vol. 55, No. 6, pp. 1031-1040.
Pertierra et al., Inorganic Chemistry Comm. (2002) vol. 5, pp. 824-828.
Poojary et al., Inorg. Chem. (1997) vol. 36, pp. 3072-3079.
Rocha et al., Chem. Comm. (1998) 1269-1270.
Yong-Nan et al., Chem. Res. Chinese U. (2002) vol. 18, No. 4, pp. 380-384.
ZS-9 Particle Size Distribution Analysis Report (4 pages), Nov. 4, 2009.
ZS Pharma Products website from Sep. 9, 2010 (http://web.archive.org/web/20100906160415/http://zspharma.com/products, accessed Mar. 28, 2014 via archive.org).
ZS Pharma Welcome website Sep. 6, 2010 (http://web.archive.org/web/20100906213849/http://zspharma.com/index.php?format=feed&type=atom, accessed Mar. 28, 2014 via archive.org) containing a comment from Dan Olson from Jan. 9, 2010.
Roswell et al., "Metal-organic Frameworks: A New Class of Porous Materials," Microporous and Mesoporous Materials (2004) vol. 73, pp. 3-14.

(56) References Cited

OTHER PUBLICATIONS

Chinese Office Action issued in Chinese Patent Application No. 201380042557.5 dated Sep. 27, 2016.
Navascués et al., "Reconstruction of umbite framework variants by atomistic simulations using XRD and sorption data," Chemical Engineering and Processing, 2008, pp. 1139-1149, vol. 47.
Australian Examination Report issued in Australian Patent Application No. 2016253652 dated Jun. 16, 2017.
European Search Report issued in European Patent Application No. 13804854.1 dated Mar. 29, 2016.
Chinese Office Action issued in Chinese Patent Application No. 201380042557.5 dated Feb. 17, 2017.
European Examination Report issued in European Patent Application No. 13804854.1 dated Mar. 6, 2017.
Stavros et al., "Characterization of Structure and Function of ZS-9, a K+ Selective Ion Trap," PLOS ONE, Dec. 22, 2014, pp. 1-12.

Red = ZrO3 (oct), Yellow = SiO2 (tet), Cations not shown

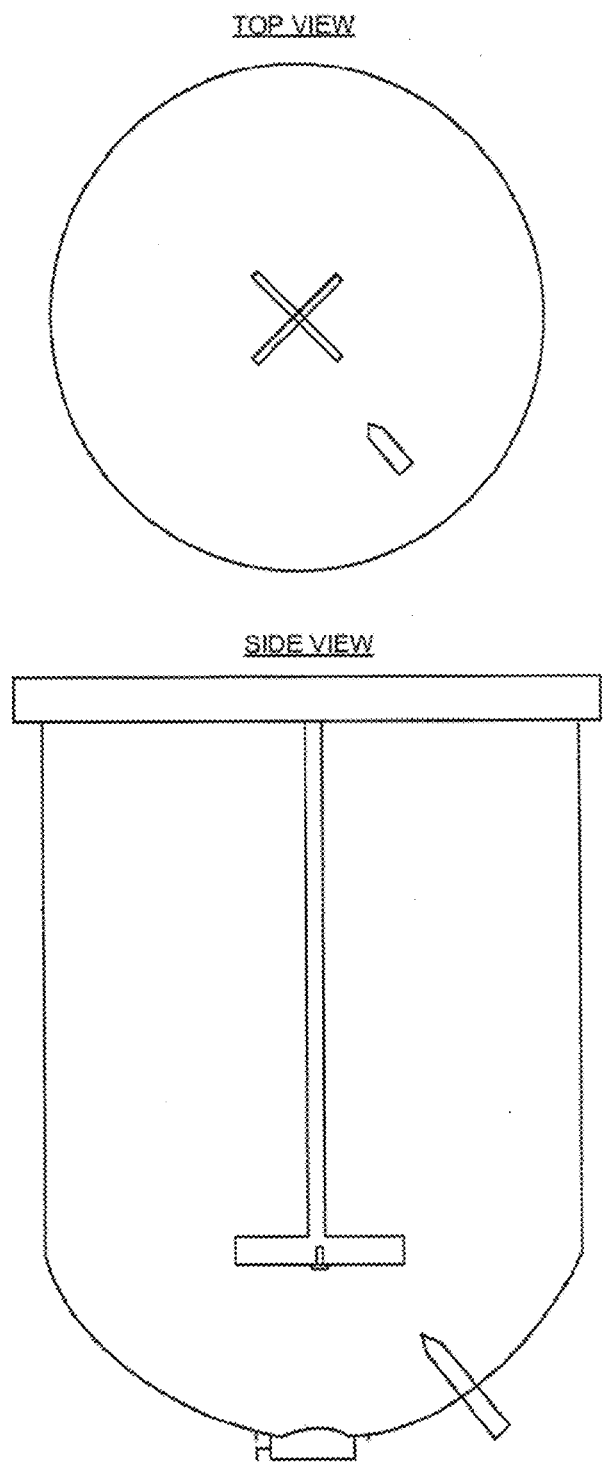
Fig. 2: 200-L reaction vessel with standard agitator arrangement.

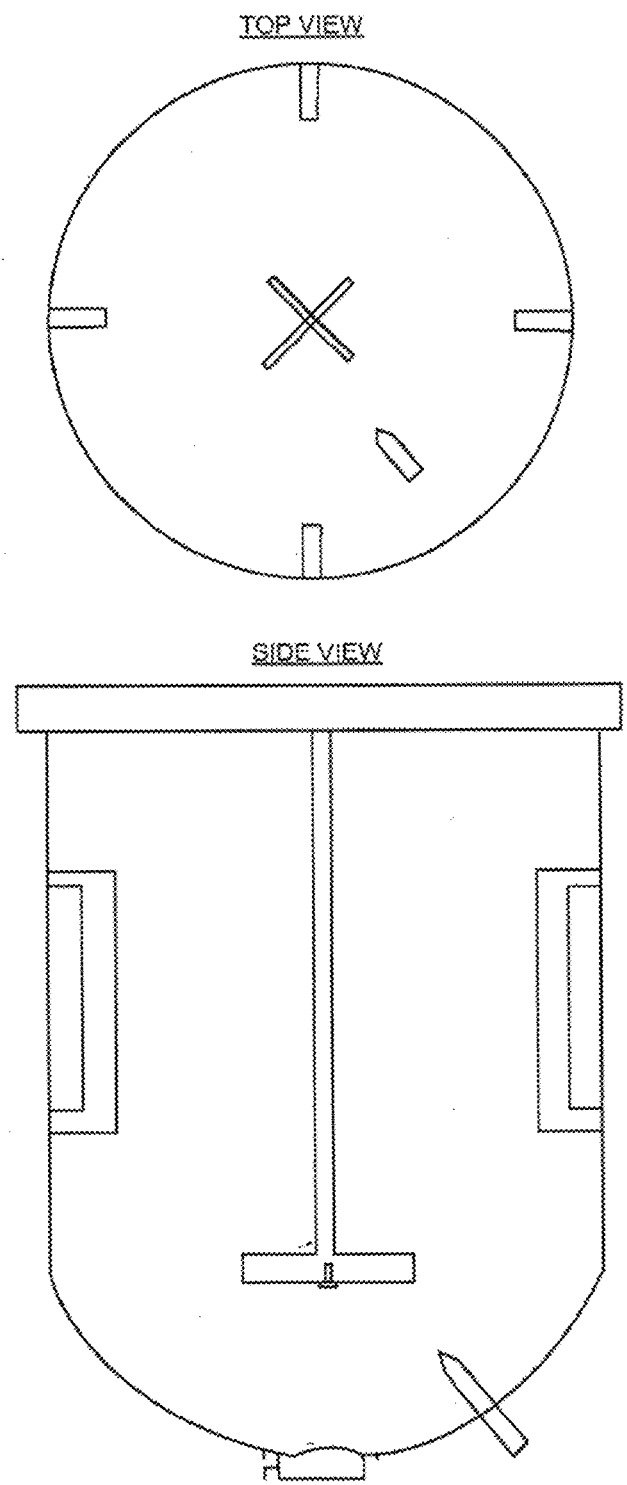
Fig. 3: 200-L reaction vessel with baffles for production of enhanced ZS-9

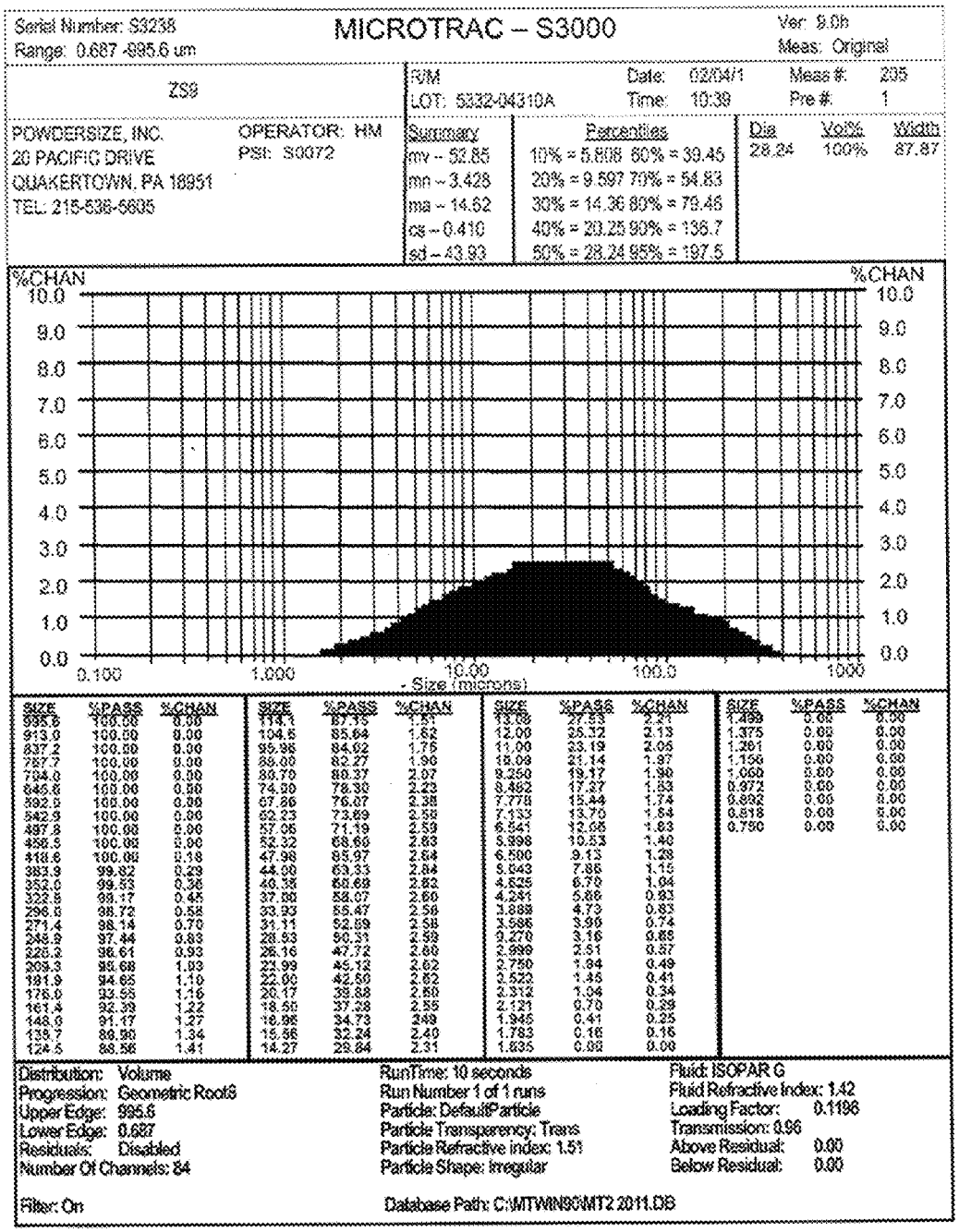
Fig. 4: (lot 5332-04321A w/o screening)

| SAMPLE ID | CUMULATIVE VOLUME % LESS | | | MEAN |
|---|---|---|---|---|
| | D(v,0.10) | D(v,0.50) | D(v,0.90) | |
| 2724 – 66J | | | | |
| Measurement 1 | 8.8 | 16.3 | 28.5 | 17.6 |
| Measurement 2 | 8.8 | 16.3 | 28.5 | 17.6 |
| Measurement 3 | 8.8 | 16.3 | 28.4 | 17.6 |
| Measurement 4 | 8.8 | 16.3 | 28.5 | 17.6 |
| Calculated | 8.8 | 16.3 | 28.5 | 17.6 |
| Standard | 0.0 | 0.1 | 0.1 | 0.0 |
| %RSD | 0.0 | 0.3 | 0.2 | 0.0 |
| 2724 – 60J | | | | |
| Measurement 1 | 8.8 | 16.1 | 28.3 | 17.5 |
| Measurement 2 | 8.8 | 16.1 | 28.2 | 17.5 |
| Measurement 3 | 8.8 | 16.1 | 28.3 | 17.5 |
| Measurement 4 | 8.8 | 16.1 | 28.3 | 17.5 |
| Calculated | 8.8 | 16.1 | 28.3 | 17.5 |
| Standard | 0.0 | 0.0 | 0.1 | 0.0 |
| %RSD | 0.0 | 0.0 | 0.2 | 0.0 |
| 2724 – 66k | | | | |
| Measurement 1 | 14.2 | 23.6 | 38.6 | 25.2 |
| Measurement 2 | 14.2 | 23.6 | 38.6 | 25.2 |
| Measurement 3 | 13.7 | 23.6 | 39.8 | 25.4 |
| Measurement 4 | 14.2 | 23.6 | 38.6 | 25.5 |
| Calculated | 14.1 | 23.6 | 38.9 | 25.3 |
| Standard | 0.3 | 0.0 | 0.6 | 0.1 |
| %RSD | 1.8 | 0.0 | 1.5 | 0.4 |
| 2724 – 66k | | | | |
| Measurement 1 | 13.9 | 22.2 | 34.7 | 23.4 |
| Measurement 2 | 13.9 | 22.2 | 34.7 | 23.4 |
| Measurement 3 | 13.9 | 22.2 | 34.7 | 23.4 |
| Measurement 4 | 13.9 | 22.1 | 34.7 | 23.4 |
| Calculated | 13.9 | 22.2 | 34.7 | 23.4 |
| Standard | 0.0 | 0.0 | 0.0 | 0.0 |
| %RSD | 0.0 | 0.2 | 1.0 | 0.0 |

Fig. 5: PSA Summary Table 2724-66J & K, Engineering Run #4, Final Product and Rosenmund Solids

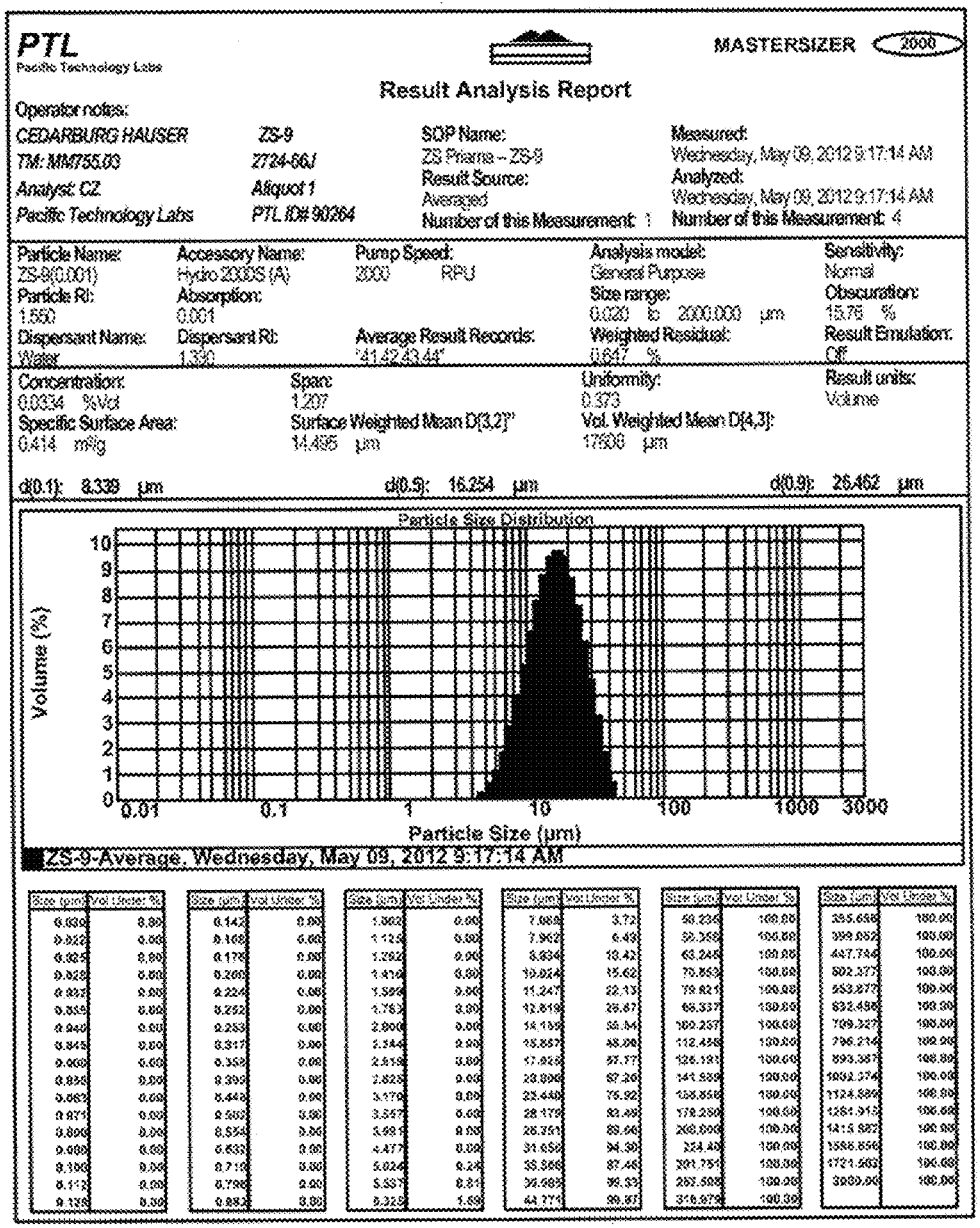
Fig. 6: Representative PSD Graph 2724-66J, Engineering Run #4, Final Product Particle Size Distribution

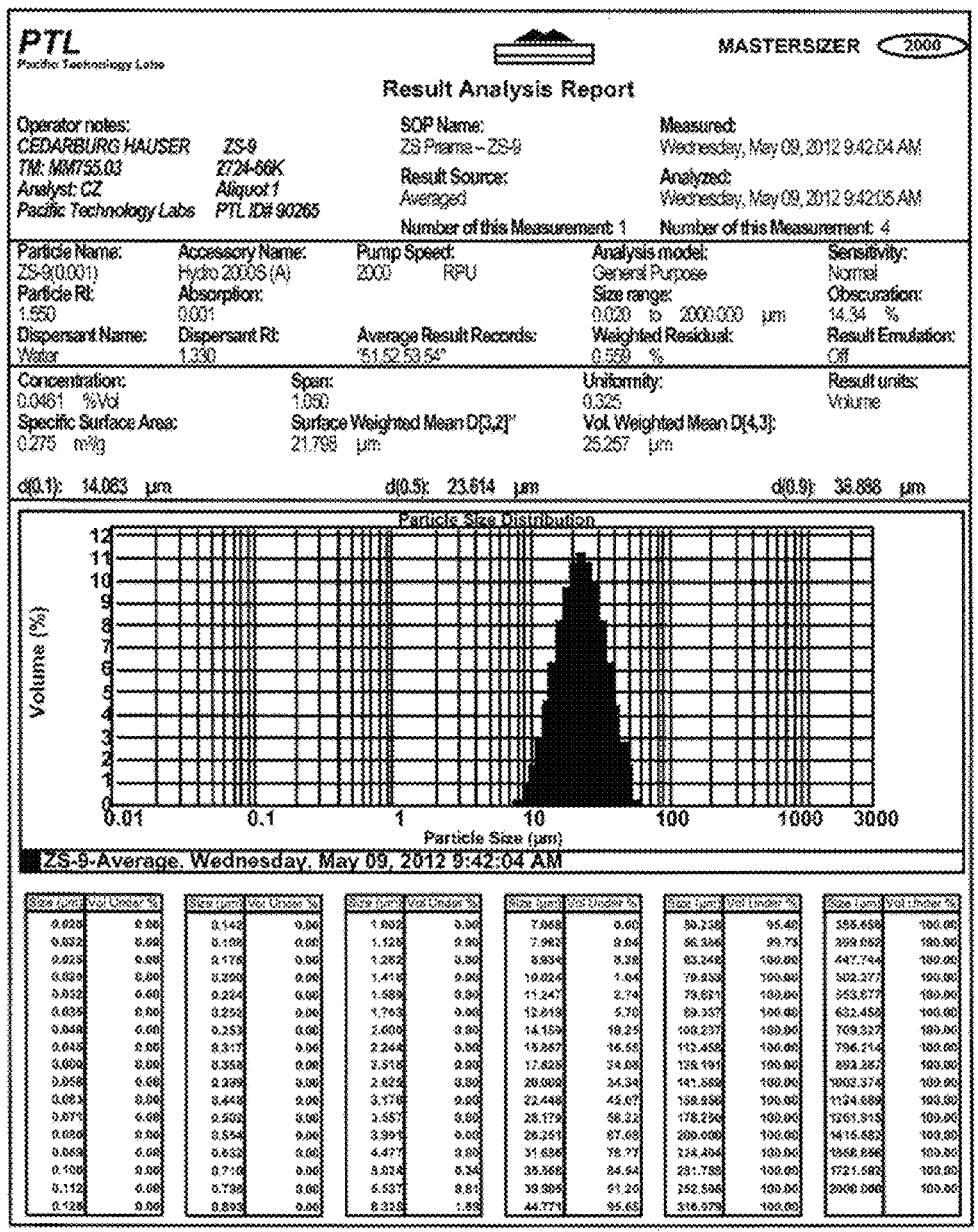
Fig. 7: Representative PSD Graph 2724-66K, Engineering Run #4, Solids from groove of Rosenmund

| SAMPLE ID | CUMULATIVE VOLUME % LESS | | | MEAN |
|---|---|---|---|---|
| | D[v,0.10] | D[v,0.50] | D[v,0.90] | |
| 2724 – 60E | | | | |
| Measurement 1 | 4.7 | 9.0 | 16.7 | 10.0 |
| Measurement 2 | 4.7 | 9.0 | 16.7 | 10.0 |
| Measurement 3 | 4.7 | 9.0 | 16.7 | 10.0 |
| Measurement 4 | 4.7 | 9.0 | 16.7 | 10.0 |
| Calculated | 4.7 | 9.0 | 16.7 | 10.0 |
| Standard | 0.0 | 0.0 | 0.0 | 0.0 |
| %RSD | 0.0 | 0.0 | 0.0 | 0.1 |
| 2724 – 60E | | | | |
| Measurement 1 | 4.7 | 9.0 | 16.7 | 10.0 |
| Measurement 2 | 4.7 | 9.1 | 16.8 | 10.0 |
| Measurement 3 | 4.7 | 9.1 | 16.9 | 10.1 |
| Measurement 4 | 4.7 | 9.1 | 16.8 | 10.0 |
| Calculated | 4.7 | 9.1 | 16.8 | 10.0 |
| Standard | 0.0 | 0.0 | 0.1 | 0.0 |
| %RSD | 0.0 | 0.6 | 0.5 | 0.5 |
| 2724 – 60G | | | | |
| Measurement 1 | 7.0 | 11.9 | 20.1 | 12.9 |
| Measurement 2 | 7.0 | 12.0 | 20.1 | 12.9 |
| Measurement 3 | 7.0 | 11.9 | 20.1 | 12.9 |
| Measurement 4 | 7.0 | 11.9 | 20.1 | 12.9 |
| Calculated | 7.0 | 11.9 | 20.1 | 12.9 |
| Standard | 0.0 | 0.0 | 0.0 | 0.0 |
| %RSD | 0.0 | 0.4 | 0.0 | 0.0 |
| 2724 – 60G | | | | |
| Measurement 1 | 6.9 | 11.9 | 20.0 | 12.8 |
| Measurement 2 | 6.9 | 11.9 | 19.9 | 12.8 |
| Measurement 3 | 6.9 | 11.9 | 19.9 | 12.8 |
| Measurement 4 | 6.9 | 11.9 | 19.9 | 12.8 |
| Calculated | 6.9 | 11.9 | 19.9 | 12.8 |
| Standard | 0.0 | 0.0 | 0.1 | 0.0 |
| %RSD | 0.0 | 0.0 | 0.3 | 0.0 |

Fig. 8: PSA Summary Table 2724-60E & G, Engineering Run #2, 62h and 63.75h Aliquots

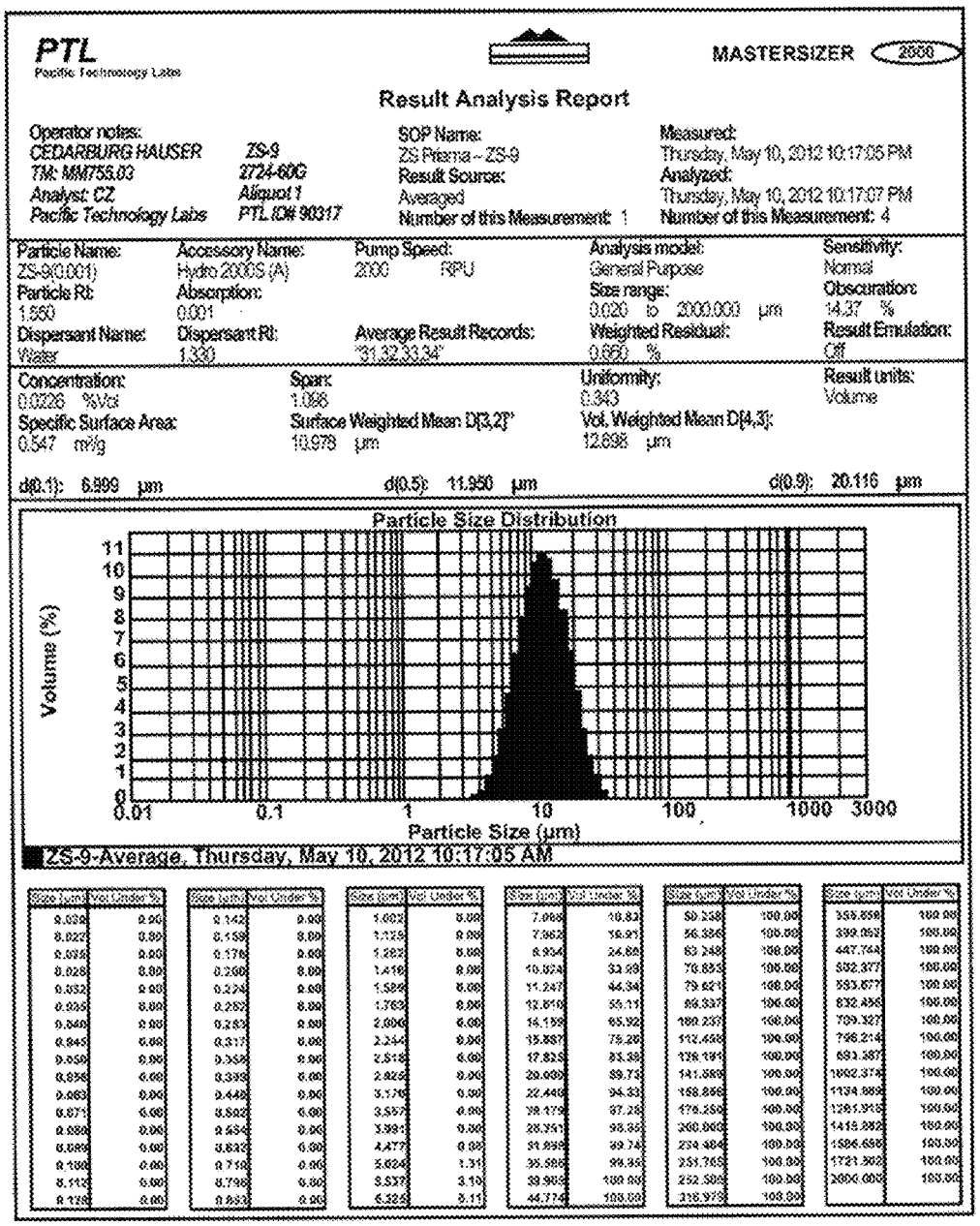
Fig. 9: Representative PSD Graph 2724-60G, Engineering Run #2, 63.75h Aliquot

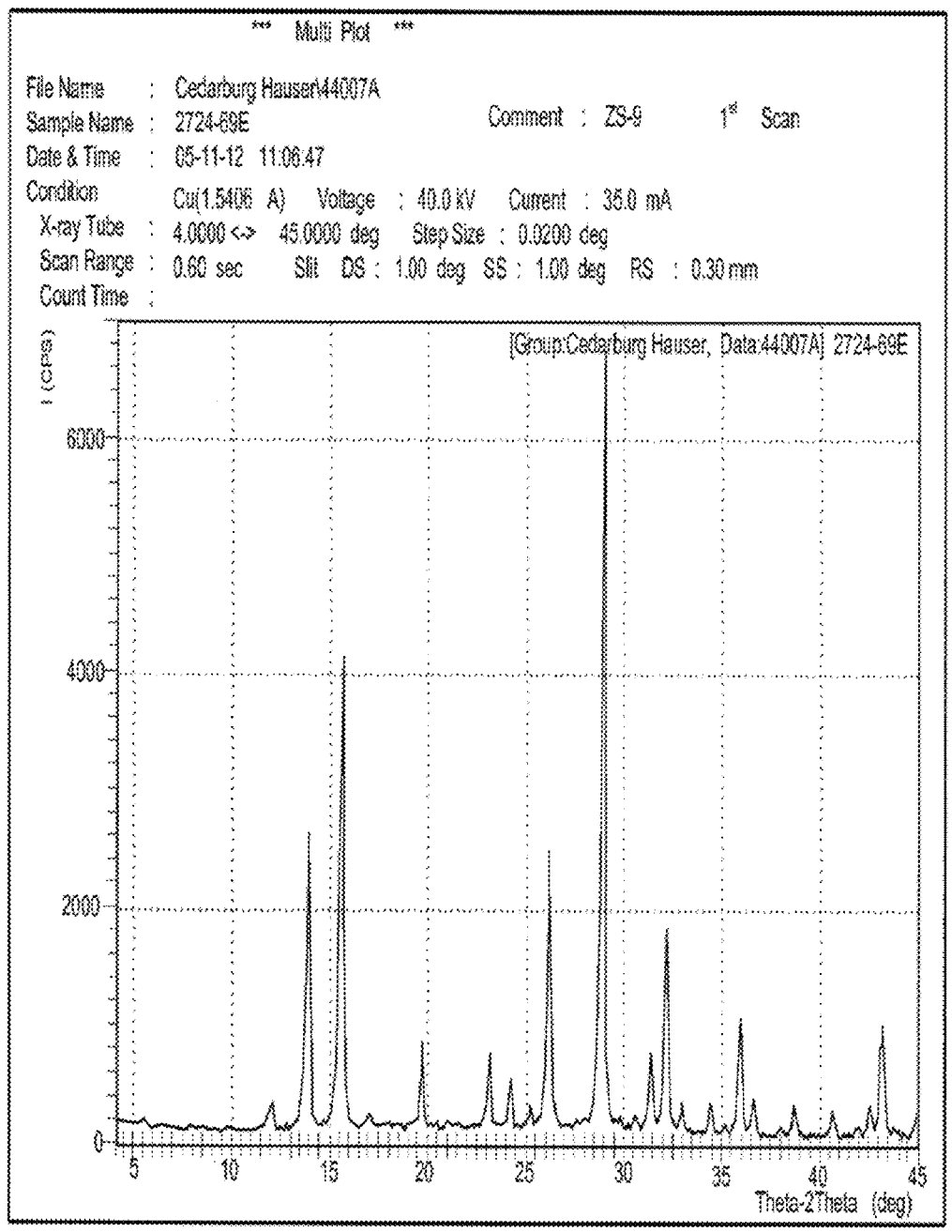
Fig. 10: PXRD 2724-69E, Engineering Run #5, Final Product

Fig. 11

PSA Summary Table 2724-69E, Engineering Run #5, Final Product

| SAMPLE ID | CUMULATIVE VOLUME % LESS | | | MEAN |
| --- | --- | --- | --- | --- |
| | D[v,0.10] | D[v,0.50] | D[v,0.90] | |
| 2724 – 69E | | | | |
| Measurement 1 | 4.6 | 8.5 | 14.8 | 9.2 |
| Measurement 2 | 4.6 | 8.5 | 14.8 | 9.2 |
| Measurement 3 | 4.7 | 8.5 | 14.8 | 9.2 |
| Measurement 4 | 4.6 | 8.5 | 14.8 | 9.2 |
| Calculated | 4.6 | 8.5 | 14.8 | 9.2 |
| Standard | 0.0 | 0.0 | 0.0 | 0.0 |
| %RSD | 0.0 | 0.1 | 0.0 | 0.0 |
| 2724 – 69E | | | | |
| Measurement 1 | 4.6 | 8.4 | 14.6 | 9.1 |
| Measurement 2 | 4.6 | 8.4 | 14.6 | 9.1 |
| Measurement 3 | 4.7 | 8.4 | 14.6 | 9.1 |
| Measurement 4 | 4.6 | 8.4 | 14.6 | 9.1 |
| Calculated | 4.6 | 8.5 | 14.6 | 9.1 |
| Standard | 0.0 | 0.0 | 0.0 | 0.0 |
| %RSD | 0.0 | 0.0 | 0.0 | 0.0 |

Representative PSD Graph 2724-69E, Engineering Run #5, Final Product

MICROPOROUS ZIRCONIUM SILICATE AND ITS METHOD OF PRODUCTION

RELATED APPLICATIONS

The present application claims benefit from U.S. Provisional Patent Application Ser. No. 61/658,117 filed Jun. 11, 2012, the contents of which are incorporated herein by reference, in its entirety.

BACKGROUND OF THE INVENTION (i) Field of the Invention

The present invention relates to novel microporous zirconium silicate compositions and processes for making such novel compositions. The novel compositions have a desirable particle size distribution. The invention also relates to novel techniques for manufacturing the microporous zirconium silicate compositions disclosed herein. These novel compositions are particularly useful for certain extracorporeal applications, including specifically within dialysis columns.

(ii) Description of the Related Art

Zirconium silicate or titanium silicate microporous ion exchangers are described in U.S. Pat. Nos. 6,579,460, 6,099,737, and 6,332,985, each of which is incorporated herein in their entirety. Additional examples of microporous ion exchangers are found in U.S. Pat. Nos. 6,814,871, 5,891,417, and 5,888,472, each of which is incorporated herein in their entirety. Improved zirconium silicate microporous ion exchangers were disclosed in U.S. Provisional Application No. 61/441,893 filed Feb. 11, 2011 and U.S. application Ser. No. 13/371,080 filed Feb. 10, 2012, which are incorporated by reference herein in their entirety. These ion exchangers addressed several undesirable effects when utilized in vivo for the removal of potassium in the treatment of hyperkalemia. For example, these applications disclose that screening can be used to remove particles having a diameter below 3 microns and that removal of such particles is beneficial for therapeutic zirconium silicate compositions.

As described in U.S. Provisional Application No. 61/441,893 filed Feb. 11, 2011 and U.S. application Ser. No. 13/371,080 filed Feb. 10, 2012, earlier reactor designs, as shown in FIG. 2, did not include heat exchange baffles. It was discovered by adding heat exchange baffles to the reactor sidewall, as shown in FIG. 3, allowed for production of high ion exchange capacity mircoporous zirconium silicate and eliminated the need for seed crystals in the process. However, it was disclosed that the ZS-9 crystals had a broad particle size distribution. For example, FIG. 4 shows the particle size distribution of a sample prior to screening.

In order to manufacture a product having an adequately defined particle size distribution, it was necessary to screen the particles after they were removed from the reactor to physically eliminate particles having unwanted sizes. The disclosed methods of screening included hand screening, air jet screening, sifting or filtering, floating or any other known means of particle classification. It was also disclosed that in addition to screening or sieving, the desired particle size distribution may be achieved using a granulation or other agglomeration technique for producing appropriately sized particles.

SUMMARY OF THE INVENTION

The inventors have discovered novel zirconium silicate molecular sieve absorbers that include an ideal particle size distribution for use ex vivo, for example in a dialysis exchange cartridge, yet retain many of the desirable properties of prior improved absorbers including high cation exchange capacity. Further, the new zirconium silicate molecular sieve absorbers can be manufactured using a technique that achieves the desired particle size distribution while eliminating the screening step that was previously necessary.

In an aspect, the invention relates to a cation exchange composition comprising a zirconium silicate of formula: $A_p M_x Zr_{1-x} Si_n Ge_y O_m$ (I) where A is a potassium ion, sodium ion, rubidium ion, cesium ion, calcium ion, magnesium ion, hydronium ion or mixtures thereof, M is at least one framework metal, wherein the framework metal is hafnium (4+), tin (4+), niobium (5+), titanium (4+), cerium (4+), germanium (4+), praseodymium (4+), terbium (4+) or mixtures thereof, "p" has a value from about 1 to about 20, "x" has a value from 0 to less than 1, "n" has a value from about 0 to about 12, "y" has a value from 0 to about 12, "m" has a value from about 3 to about 36 and $1 \leq n+y \leq 12$, wherein the composition exhibits a volume weighted mean particle size between 5 and 20 microns wherein less than 10% of the particles have a size below 5 microns and less than 10% of the particles have a size above 25 microns, wherein the particle size distribution does not result from a screening or classification process. Preferably, the mean particle size is between 10 and 15 microns. Preferably the cation exchange capacity is greater than 4.0 meq/g, more preferably greater than 4.4 meq/g. The cation exchange composition may be incorporated into a number of devices, such as exchange columns, dialysis columns, etc.

In another aspect, the invention involves a method including steps of providing a reaction mixture comprising sodium silicate and zirconium acetate in a reactor; agitating the reaction mixture with an agitator in the presence of one or more baffle-like structures in a range of agitation speed ranging from 80 rpm to 350 rpm. It has been unexpectedly found that end-sized microporous zirconium silicate can be produced when operating the reaction within this range of agitation speed. The invention advantageously avoids the need to conduct any screening or classification of the microporous zirconium silicate. Where desirable, different lots of the microporous zirconium silicate can be blended in order to produce a desired particle size distribution.

BRIEF DESCRIPTION OF THE DRAWINGS

FIG. 2: Reaction vessel with baffles for production of enhanced ZS-9

FIG. 3: Detail of baffle design for 200-L reaction vessel for production of enhanced ZS-9

FIG. 4: Particle size distribution of UZSi-9 without screening.

FIG. 5: Particle size analysis for Example 1a.

FIG. 6: Particle size distribution for final product of Example 1a.

FIG. 7: Particle size distribution for solids from groove of Rosenmund for Example 1a.

FIG. 8: Particle size analysis for Example 2.

FIG. 9: Particle size distribution for Example 2.

FIG. 10: Particle XRD for Example 3.

FIG. 11: Particle size analysis for Example 3.

DETAILED DESCRIPTION OF THE INVENTION

Figure 1:
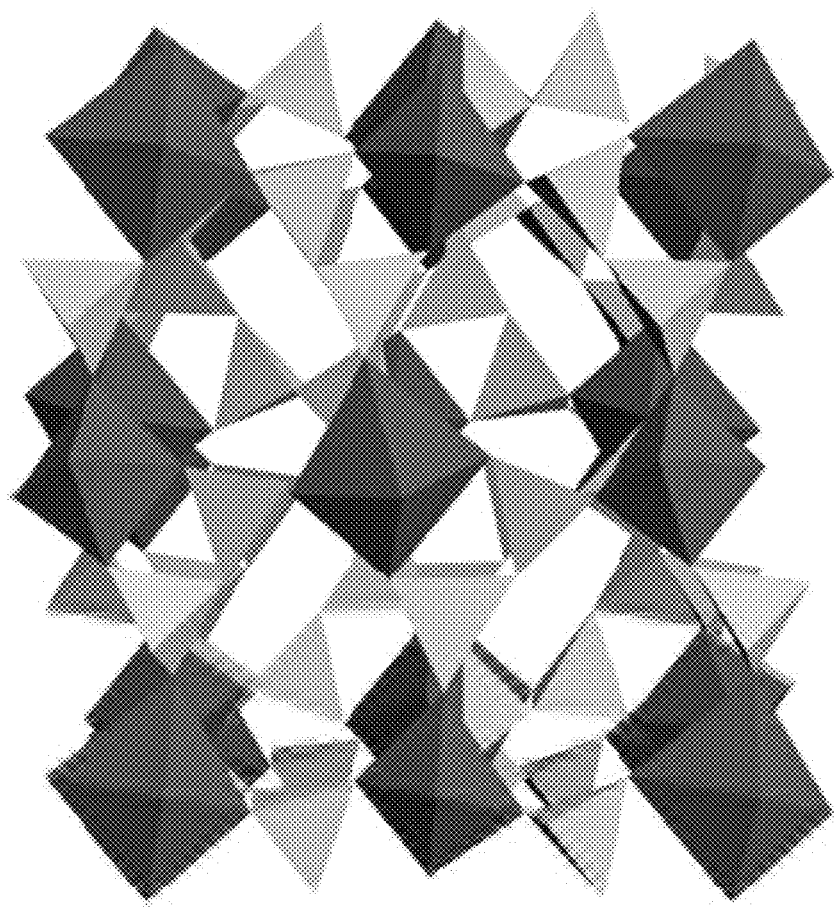
FIG. 1 is a polyhedral drawing showing the structure of microporous zirconium silicate $Na_{2.19}ZrSi_{3.01}O_{9.11} \cdot 2.71H_2O$ (MW 420.71)
Figure 12:
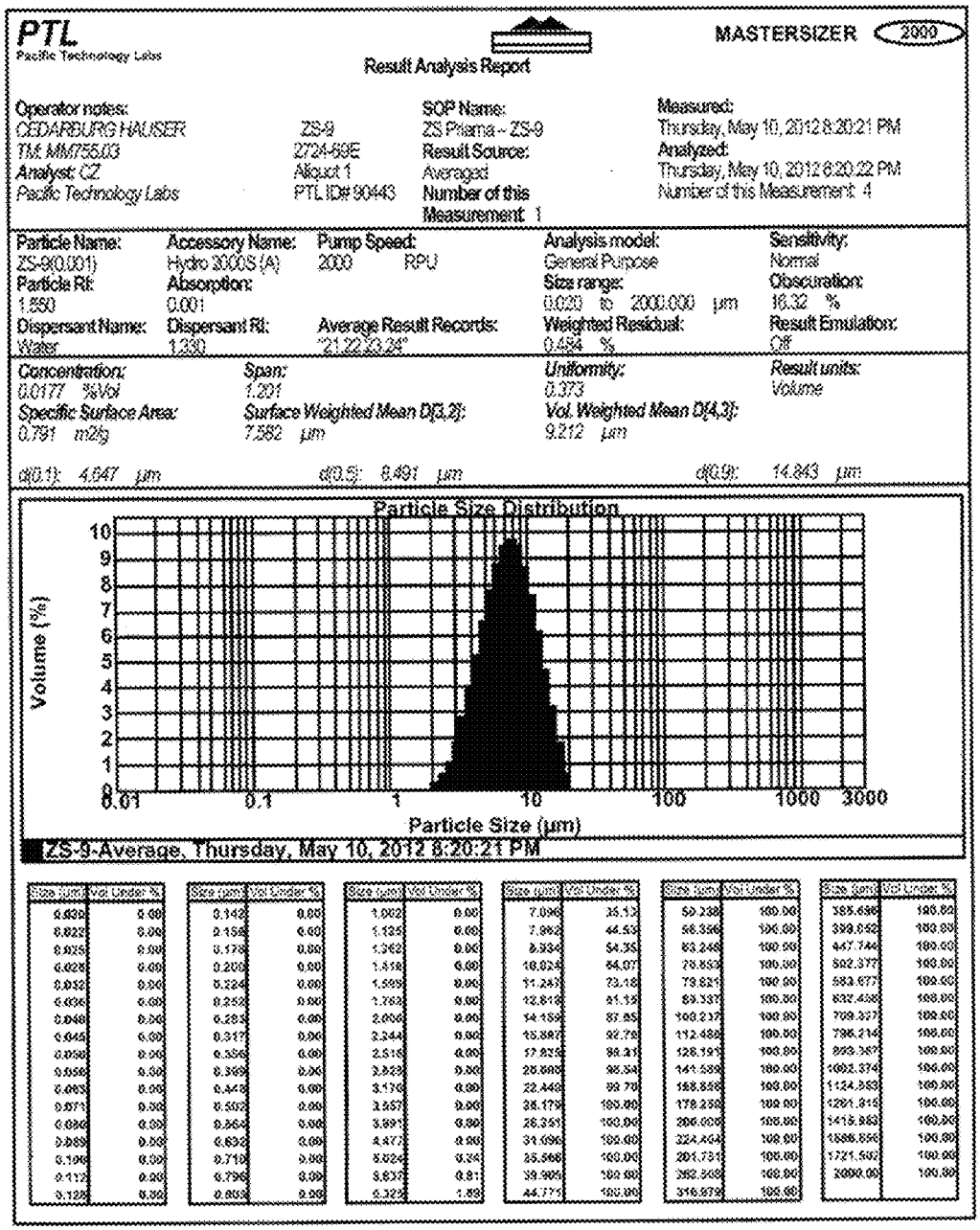
FIG. 12: Particle size distribution for Example 3.

As described in U.S. Provisional Application No. 61/441,893 filed Feb. 11, 2011 and U.S. application Ser. No. 13/371,080 filed Feb. 10, 2012, Zirconium silicate has a microporous framework structure composed of $ZrO_2$ octahedral units and $SiO_2$ tetrahedral units. FIG. 1 is a polyhedral drawing showing the structure of microporous zirconium silicate $Na_{2.19}ZrSi_{3.01}O_{9.11} \cdot 2.71H_2O$ (MW 420.71) The dark polygons depict the octahedral zirconium oxide units while the light polygons depict the tetrahedral silicon dioxide units. Cations are not depicted in FIG. 1.

The microporous exchanger of the invention has a large capacity and strong affinity, i.e., selectivity, for potassium or ammonium. Eleven types of zirconium silicate are available, UZSi-1 through UZSi-11, each having various affinities to ions have been developed. See e.g., U.S. Pat. No. 5,891,417. UZSi-9 (otherwise known as ZS-9) is a particularly effective zirconium silicate absorber for absorbing potassium and ammonium. These zirconium silicates have the empirical formula:

$$A_p M_x Zr_{1-x} Si_n Ge_y O_m \quad (I)$$

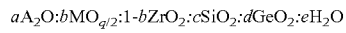

where A is an exchangeable cation selected from potassium ion, sodium ion, rubidium ion, cesium ion, calcium ion, magnesium ion, hydronium ion or mixtures thereof, M is at least one framework metal selected from the group consisting of hafnium (4+), tin (4+), niobium (5+), titanium (4+), cerium (4+), germanium (4+), praseodymium (4+), and terbium (4+), "p" has a value from about 1 to about 20, "x" has a value from 0 to less than 1, "n" has a value from about 0 to about 12, "y" has a value from 0 to about 12, "m" has a value from about 3 to about 36 and $1 \leq n+y \leq 12$. The germanium can substitute for the silicon, zirconium or combinations thereof. It is preferred that x and y are zero or both approaching zero, as germanium and other metals are often present in trace quantities. Since the compositions are essentially insoluble in bodily fluids (at neutral or basic pH), they can be orally ingested in order to remove toxins in the gastrointestinal system.

The zirconium metallates are prepared by a hydrothermal crystallization of a reaction mixture prepared by combining a reactive source of zirconium, silicon and/or germanium, optionally one or more M metal, at least one alkali metal and water. The alkali metal acts as a templating agent. Any zirconium compound, which can be hydrolyzed to zirconium oxide or zirconium hydroxide, can be used. Specific examples of these compounds include zirconium alkoxide, e.g., zirconium n-propoxide, zirconium hydroxide, zirconium acetate, zirconium oxychloride, zirconium chloride, zirconium phosphate and zirconium oxynitrate. The sources of silica include colloidal silica, fumed silica and sodium silicate. The sources of germanium include germanium oxide, germanium alkoxides and germanium tetrachloride. Alkali sources include potassium hydroxide, sodium hydroxide, rubidium hydroxide, cesium hydroxide, sodium carbonate, potassium carbonate, rubidium carbonate, cesium carbonate, sodium halide, potassium halide, rubidium halide, cesium halide, sodium ethylenediamine tetraacetic acid (EDTA), potassium EDTA, rubidium EDTA, and cesium EDTA. The M metals sources include the M metal oxides, alkoxides, halide salts, acetate salts, nitrate salts and sulfate salts. Specific examples of the M metal sources include, but are not limited to titanium alkoxides, titanium tetrachloride, titanium trichloride, titanium dioxide, tin tetrachloride, tin isopropoxide, niobium isopropoxide, hydrous niobium oxide, hafnium isopropoxide, hafnium chloride, hafnium oxychloride, cerium chloride, cerium oxide and cerium sulfate.

Generally, the hydrothermal process used to prepare the zirconium metallate or titanium metallate ion exchange compositions of this invention involves forming a reaction mixture which in terms of molar ratios of the oxides is expressed by the formulae:

$$aA_2O:bMO_{q/2}:1-bZrO_2:cSiO_2:dGeO_2:eH_2O$$

where "a" has a value from about 0.25 to about 40, "b" has a value from about 0 to about 1, "q" is the valence of M, "c" has a value from about 0.5 to about 30, "d" has a value from about 0 to about 30 and "e" has a value of 10 to about 3000. The reaction mixture is prepared by mixing the desired sources of zirconium, silicon and optionally germanium, alkali metal and optional M metal in any order to give the desired mixture. It is also necessary that the mixture have a basic pH and preferably a pH of at least 8. The basicity of the mixture is controlled by adding excess alkali hydroxide and/or basic compounds of the other constituents of the mixture. Having formed the reaction mixture, it is next reacted at a temperature of about 100° C. to about 250° C. for a period of about 1 to about 30 days in a sealed reaction vessel under autogenous pressure. After the allotted time, the mixture is filtered to isolate the solid product which is washed with deionized water, acid or dilute acid and dried. Numerous drying techniques can be utilized including vacuum drying, tray drying, fluidized bed drying. For example, the filtered material may be oven dried in air under vacuum.

To allow for ready reference, the different structure types of the zirconium silicate molecular sieves and zirconium germanate molecular sieves have been given arbitrary designations of UZSi-1 where the "1" represents a framework of structure type "1". That is, one or more zirconium silicate and/or zirconium germanate molecular sieves with different empirical formulas can have the same structure type.

The X-ray patterns presented in the following examples were obtained using standard X-ray powder diffraction techniques and reported in U.S. Pat. No. 5,891,417. The radiation source was a high-intensity X-ray tube operated at 45 Kv and 35 ma. The diffraction pattern from the copper K-alpha radiation was obtained by appropriate computer based techniques. Flat compressed powder samples were continuously scanned at 2° (2θ) per minute. Interplanar spacings (d) in Angstrom units were obtained from the position of the diffraction peaks expressed as 2 θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of $100 \times I/I_o$, the above designations are defined as w=0-15; m=15-60; s=60-80 and vs=80-100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

The crystalline compositions of the instant invention may be characterized by their X-ray powder diffraction patterns and such may have one of the X-ray patterns containing the d-spacings and intensities set forth in the following Tables. The x-ray pattern for ZS-11 as reported in U.S. Pat. No. 5,891,417, is as follows:

TABLE 1

| UZSi-11 | |
| --- | --- |
| d (Å) | I |
| 6.0-6.8 | w-m |
| 5.5-6.3 | m |
| 5.4-6.2 | vs |
| 5.2-6.0 | m |
| 2.7-3.5 | s |
| 2.5-3.3 | m |

The x-ray diffraction pattern for the high-purity, high KEC ZS-9 is reported in U.S. patent application Ser. No. 13/371,080 (Example 13, FIG. 13) as having the following characteristics d-spacing ranges and intensities:

TABLE 2

| UZSi-9 | |
| --- | --- |
| d (Å) | I |
| 5.9-6.7 | m |
| 5.3-6.1 | m-s |
| 2.7-3.5 | vs |
| 2.0-2.8 | w-m |
| 1.6-2.4 | w |

The formation of zirconium silicate involves the reaction of sodium silicate and zirconium acetate in the presence of sodium hydroxide and water. In order to obtain high potassium ion exchange capacity and crystalline purity (as shown by XRD and FTIR spectra) it is necessary to properly position a baffle-like structure in relation to the agitator within the crystallization vessel. When these conditions are met, significantly higher levels of potassium exchange capacity (KEC) are attainable. For example, UZSi-9 crystals will have a potassium exchange capacity of greater than 2.5 meq/g, more preferably greater than 3.5 meq/g, more preferably greater than 4.0 meq/g, more preferably between 4.3 and 4.8 meq/g, even more preferably between 4.4 and 4.7 meq/g, and most preferably approximately 4.5 meq/g. These techniques also allow one to dispense with using seed crystals. An elevated exchange capacity for other ions such as ammonium ($NH_4^+$), alkali metal cations ($K^+$, $Na^+$, $Rb^+$, $Cs^+$), alkaline earth cations ($Mg^{2+}$, $Ca^{2+}$, $Sr^{2+}$, $Ba^{2+}$) and hydronium can be achieved. When used as an absorber for ammonium cations, UZSi-9 crystals will exhibit an exchange capacity of greater than 3.0 meq/g, more preferably greater than 5.0 meq/g, more preferably greater than 5.5 meq/g, more preferably between 5 and 6 meq/g.

It has been unexpectedly found that when producing high cation exchange capacity absorbers using these techniques that an end-sized product having a desired particle size distribution can be obtained through careful control of the reaction conditions. The production of an end-sized product is advantageous in that it eliminates the need for any subsequent screening steps which were previously required. The following examples demonstrate that through careful control of the agitation rate in a reactor having baffles an end-sized absorber can be obtained without the use of screening steps. Specifically, when a lower rate of agitation is utilized, the product will tend to have a higher mean particle size. When a higher rate of agitation is used, the product will tend to have a lower mean particle size. In either case, the microporous zirconium silicate exhibited a particle size distribution that was adequate for use of the particles without further screening. These compositions differ structurally from screened compositions by exhibiting smoother size distributions which are not as sharp as those obtained when the PSD is obtained using screens or other classification techniques.

Although it is envisioned that the process of the present invention will completely eliminate the need for any particle screening or classification, the microporous zirconium silicate of the present invention may be subject to screening if desired. The term screening includes hand screening, air jet screening, sifting or filtering, floating or any other known means of particle classification. In the case where screening is utilized, the present invention provides an initial product that is closer to the desired size thereby improving the screening efficiency. In addition, the product of the present invention may be subjected to other processes for producing appropriately size particles such as granulation or agglomeration if desired.

Example 1a (Engineering Run #4)—150 RPM & 77 h @ 210° C.

In this example, reactants including zirconium acetate (11.5 kg), sodium silicate (27.81 kg), NaOH (3.68 kg), and deionized water (50.67 kg) were charged to the reactor and the temperature was directly heated to 210° C. This temperature was maintained for 77 hours. The temperature was then lowered to 76° C. over 1.5 hours. This example utilized a stir speed of 150 rpm.

The Final product weighed 7.79 Kg. The product had a clean ATR and PXRD spectra. The potassium exchange value was 3.16 and the solids pH was 8.67. The protonation slurry was adjusted to pH=4.66 during this run.

Table 3 below summarizes the particle size analysis data.

TABLE 3

| Exp. # | | Particle Size Analysis | | | | |
|---|---|---|---|---|---|---|
| 2724- | Description | D[v, 0.10](μm) | D[v, 0.50](μm) | D[v, 0.90](μm) | D[4, 3](μm) | Appendices |
| 66J | Final | 8.8 | 16.3 | 28.5 | 17.6 | FIGS. 5, 6 |
| 66A | 24 h aliquot | 9.6 | 19.8 | 50.3 | 29.3 | |
| 66C | 48 h aliquot | 11.8 | 20.0 | 32.8 | 21.3 | |
| 66E | 72.5 h aliquot | 11.4 | 20.1 | 34.3 | 21.6 | |
| 66G | 94 h aliquot | 16.2 | 24.8 | 37.7 | 26.1 | |
| 66K | Rosenmund solids | 14.1 | 23.6 | 38.9 | 25.3 | FIG. 7 |

Example 1b (Engineering Run #3)—150 RPM & 60 h @ 210° C.

In this example, reactants including zirconium acetate (11.55 kg), sodium silicate (27.84 kg), NaOH (3.68 kg), and deionized water (50.57 kg) were charged to the reactor and the temperature was directly heated to 210° C. This temperature was maintained for 60 hours. This example utilized a stir speed of 150 rpm.

The Final product weighed 7.87 Kg. The product had a clean ATR and PXRD spectra. The potassium exchange value was 3.07 and the solids pH was 8.77. The sodium (Na+) content was 9.38%. The protonation slurry was adjusted to pH=4.86 during this run. The preliminary mean particle size measurement was 17.6 μm with no particles below 6.325 μm being present. The final mean particle size remained nearly twice as large as when faster stirring is used (see Examples 2-3 below) and no particles below 6.325 μm were observed.

As observed in Example 1a, which also utilized a slower 150 rpm stirring speed, the particle size is larger than in faster, 307 rpm, experiments shown below in Examples 2-3.

Example 2

(Engineering Run #2)—307 RPM & 60 h @ 210° C.

In this example, reactants including zirconium acetate (11.54 kg), sodium silicate (27.99 kg), NaOH (3.69 kg), and deionized water (50.59 kg) were charged to the reactor and the temperature was directly heated to 210° C. This temperature was maintained for 60 hours. This example utilized a stir speed of 307 rpm.

The Final product weighed 7.37 Kg The product had a clean ATR and PXRD spectra. The potassium exchange value was 3.21 and the solids pH was 8.75. The sodium (Na+) content was 8.43%. The protonation slurry was adjusted to pH=4.93 during this run.

Table 4 below summarizes all the PSA data for this run and lists the Appendices where the summary tables and the representative particle size distribution (PSD) graphs are located for the new data.

TABLE 4

| Exp. # | | Particle Size Analysis | | | | |
|---|---|---|---|---|---|---|
| 2724- | Description | D[v, 0.10](μm) | D[v, 0.50](μm) | D[v, 0.90](μm) | D[4, 3](μm) | Appendices |
| 60K | Final | 5.5 | 9.8 | 16.9 | 10.6 | |
| 60A | 21.5 h aliquot | 5.1 | 9.7 | 18.0 | 10.8 | |
| 60C | 49 h aliquot | 4.7 | 9.0 | 16.4 | 9.9 | |
| 60E | 62 h aliquot | 4.7 | 9.0 | 16.7 | 10.0 | |
| 60G | 63.75 h aliquot | 7.0 | 11.9 | 20.1 | 12.9 | FIGS. 8, 9 |
| 60I | Re-filtered solids from filtrates | 6.6 | 10.6 | 16.6 | 11.2 | |
| 60L | Rosenmund solids | 6.3 | 10.9 | 18.3 | 11.7 | |

Example 3

(Engineering Run #5)—307 RPM & 45 h @ 210° C.

In this example, reactants including zirconium acetate (11.49 kg), sodium silicate (27.86 kg), NaOH (3.68 kg), and deionized water (50.75 kg) were charged to the reactor and the temperature was directly heated to 210° C. This temperature was maintained for a shortened time of 48 hours. This example utilized a stir speed of 307 rpm.

The Final product weighed 7.79 Kg. The product had a clean ATR and PXRD spectra. The potassium exchange value was 3.23 and the solids pH was 8.80. The protonation slurry was adjusted to pH=4.89 during this run.

Table 5 below summarizes the PSA data and lists the Appendices where the summary tables and the representative PSD graphs are located.

TABLE 5

| Exp. # 2724- | Description | Particle Size Analysis | | | | Appendices |
|---|---|---|---|---|---|---|
| | | D[v, 0.10](μm) | D[v, 0.50](μm) | D[v, 0.90](μm) | D[4, 3](μm) | |
| 69E | Final | 4.6 | 8.5 | 14.8 | 9.2 | FIG. 11 |
| 69A | 25 h aliquot | 4.6 | 8.8 | 15.9 | 9.7 | S, T |
| 69C | 48.5 h aliquot | 4.9 | 8.8 | 15.3 | 9.5 | S, U |

As can be seen from the PSA data above, the particle size is smaller in the faster stirred reaction.

Extracorporal Applications

The zirconium silicate absorber compositions of examples 2-3 are particularly useful in the case of extracorporal applications such as in ion exchange columns, absorption columns or dialysis cartridges. Also, since there is no need to screen the particles thus obtained, the manufacturing processes of Examples 2-3 are more efficient than prior processes which did not produce an end-sized product.

Dialysis cartridges in the past have been manufactured using absorbents such as zirconium phosphate for adsorbing ammonium ions produced from urea degradation. For example, U.S. Pat. No. 7,566,432 to Raymond Wong, the contents which are incorporated by reference herein, discloses dialysis cartridges utilizing ZrP as the adsorbent material. One specific extracorporal application that this invention is particularly suitable for is in the manufacture of dialysis cartridges. This is because the inventive zirconium silicate absorbers can be made with a high exchange capacity for ammonium and a desirable particle size distribution. These desirable particles can be prepared without the use of a particle screening or classification step based on the end-sized particles obtained with processes of the present invention.

In one aspect, a dialysis cartridge is prepared and loaded with the absorbent particles of Example 1a. The dialysis cartridge will thus have a microporous zirconium silicate with a volume weighted mean particle size of 17.6 μm with less than 10% of the particles having a particle size below 8.8 μm and less than 10% of the particles having a particle size larger than 28.5 μm. By avoiding significant quantities of material having a particle size below 10 μm, the dialysis cartridge will exhibit an adequate flowrate at pressures used in dialysis systems. Further, the dialysis cartridge will benefit from enhanced cation exchange capacity and a process of production that avoids particle screening and/or classification.

In another aspect, a dialysis cartridge is prepared and loaded with the absorbent particles of Example 3. The dialysis cartridge will thus have a microporous zirconium silicate with a volume weighted mean particle size of 9.2 μm with less than 10% of the particles having a particle size below 4.6 μm and less than 10% of the particles having a particle size larger than 14.8 μm. The flowrate through this dialysis column would be lower than the cartridge utilizing the absorbents of Example 1a at a given working pressure of the dialysis machine.

In yet another aspect, a dialysis column may be prepared by blending two or more batches of microporous zirconium silicate prepared in accordance with the present invention. By blending different batches a microporous zirconium silicate, the cartridge can be prepared with an optimal particle size distribution without the need for screening or classification steps.

While the present invention has been shown to avoid the necessity of additional screening or classification steps for particular applications, it still may be desirable to screen batches of blends of batches of microporous zirconium silicate for a particular application. In this case, the particle size distribution of the present invention is still beneficial as the number of screening steps may be reduced significantly. For example, it may be desirable to screen out particles having a size above a predetermined cutoff without also screening out particles having a size below a certain amount, or vice-versa.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

The invention claimed is:

1. A method for making a cation exchange composition comprising a zirconium silicate, the method comprising:
    providing a reaction mixture comprising a reactive source of silica and a reactive source of zirconium in a reactor;
    agitating the reaction mixture in a 200 liter reactor with an agitator in the presence of four vertically placed baffle-like structures on the inner reactor sidewall with an agitation speed within a range of 80 rpm to 350 rpm, at a basic pH, and at a temperature of 100° C. to 250° C. for a duration of 1 day to 30 days; and
    obtaining the cation exchange composition from the reactor
    wherein the zirconium silicate is of formula (I):

$$A_p M_x Zr_{1-x} Si_n Ge_y O_m \qquad (I)$$

where
    A is a potassium ion, sodium ion, rubidium ion, cesium ion, calcium ion, magnesium ion, hydronium ion or mixtures thereof,
    M is at least one framework metal, wherein the framework metal is hafnium (4+), tin (4+), niobium (5+), titanium (4+), cerium (4+), germanium (4+), praseodymium (4+), terbium (4+) or mixtures thereof,
    "p" has a value from about 1 to about 20,
    "x" has a value from 0 to less than 1,
    "n" has a value from about 1 to about 12,
    "y" has a value from 0 to about 12,
    "m" has a value from about 3 to about 36 and 1≤n+y≤12,
    wherein the composition exhibits a volume weighted mean particle size between 5 and 20 microns wherein less than 10% of the particles have a size below 5 microns.

2. The method of claim 1, further comprising contacting the zirconium silicate with a dilute solution of strong acid and/or water.

3. The method of claim 1, further comprising blending different lots of the cation exchange composition to produce a desired particle size distribution.

4. The method of claim 1, wherein the agitation speed is within the range of 120 and 170 rpm.

5. The method of claim 4, wherein the agitation speed is approximately 150 rpm.

6. The method of claim 1, wherein the agitation speed is within the range of 190 and 320 rpm.

7. The method of claim 6, wherein the agitation speed is approximately 307 rpm.

8. The method of claim 1, wherein the reactive source of silica is sodium silicate.

9. The method of claim 1, wherein the reactive source of zirconium is zirconium acetate.

10. The method of 1, wherein the zirconium silicate is a ZS-9.

11. The method of 1, wherein A is a hydronium ion.

12. The method of claim 1, wherein x is 0, n is 3, and m is 9.

13. The method of claim 1, wherein the zirconium silicate has a X-ray diffraction pattern generated using a copper K-alpha radiation source of:

| d(Å) |
|---|
| 5.9-6.7 |
| 5.3-6.1 |
| 2.7-3.5 |
| 2.0-2.8 |
| 1.6-2.4. |

* * * * *